United States Patent
Gaber et al.

(10) Patent No.: US 11,126,612 B2
(45) Date of Patent: Sep. 21, 2021

(54) IDENTIFYING ANOMALIES IN USER INTERNET OF THINGS ACTIVITY PROFILE USING ANALYTIC ENGINE

(71) Applicant: EMC IP Holding Company LLC, Hopkinton, MA (US)

(72) Inventors: Shiri Gaber, Beer Sheva (IL); Omer Sagi, Mazkeret Batya (IL); Avitan Gefen, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 188 days.

(21) Appl. No.: 16/173,291

(22) Filed: Oct. 29, 2018

(65) Prior Publication Data
US 2020/0134061 A1    Apr. 30, 2020

(51) Int. Cl.
| | | |
|---|---|---|
| *G06F 16/20* | (2019.01) | |
| *G06F 16/23* | (2019.01) | |
| *G06Q 20/10* | (2012.01) | |
| *G06F 16/22* | (2019.01) | |
| *G06N 5/04* | (2006.01) | |
| *G06N 20/00* | (2019.01) | |

(52) U.S. Cl.
CPC ...... *G06F 16/2365* (2019.01); *G06F 16/2228* (2019.01); *G06Q 20/10* (2013.01); *G06N 5/047* (2013.01); *G06N 20/00* (2019.01)

(58) Field of Classification Search
CPC . G06F 16/2365; G06F 16/2228; G06Q 20/10; G06N 20/00; G06N 5/047
See application file for complete search history.

(56) References Cited

U.S. PATENT DOCUMENTS

| | | | |
|---|---|---|---|
| 9,516,053 B1 * | 12/2016 | Muddu | G06F 16/285 |
| 2016/0139575 A1 * | 5/2016 | Funes | H04L 41/16 |
| | | | 700/275 |
| 2016/0299938 A1 * | 10/2016 | Malhotra | G06F 16/2365 |
| 2016/0301707 A1 * | 10/2016 | Cheng | H04L 43/12 |
| 2017/0134412 A1 * | 5/2017 | Cheng | H04L 67/2842 |
| 2017/0244731 A1 * | 8/2017 | Hu | H04L 63/1425 |

(Continued)

OTHER PUBLICATIONS

OECD Digital Economy Papers, IoT measurement and Applications, Oct. 2018, OECD, No. 271, all pages. (Year: 2018).*

(Continued)

*Primary Examiner* — Jau Shya Meng
(74) *Attorney, Agent, or Firm* — Ryan, Mason & Lewis, LLP

(57) ABSTRACT

Techniques are provided for identifying anomalies in an Internet of Things (IoT) activity profile of a user using an analytic engine. An exemplary method comprises obtaining data from a plurality of IoT devices of a user, wherein at least one IoT device comprises an agent device that performs an action on behalf of the user; applying the obtained data to a feature engineering module to convert the obtained data into time-series features that capture behavior and/or characteristics of an IoT environment of the user; and applying the time-series features to an analytic engine comprising a multi-variate anomaly detection method that learns one or more patterns in the IoT activity profile of the user for a normal state and identifies an anomaly with respect to an action performed by the agent device based on a health score indicating a deviation from the learned patterns.

20 Claims, 7 Drawing Sheets

(56) References Cited

U.S. PATENT DOCUMENTS

| | | | |
|---|---|---|---|
| 2018/0219759 A1* | 8/2018 | Brown | H04L 67/18 |
| 2018/0219888 A1* | 8/2018 | Apostolopoulos | G06F 16/9024 |
| 2018/0247220 A1* | 8/2018 | Assem Aly Salama | G06N 20/00 |
| 2018/0284743 A1* | 10/2018 | Celia | G05B 19/41845 |
| 2019/0356533 A1* | 11/2019 | Vasseur | G06N 20/00 |
| 2020/0082013 A1* | 3/2020 | Triplet | G06K 9/6219 |
| 2020/0151577 A1* | 5/2020 | Ogawa | G06N 3/063 |

OTHER PUBLICATIONS

Sangaiah et al. Cognitive Computing for Big Data Systems Over IoT, Springer, 2017, vol. 14, all pages. (Year: 2017).*
U.S. Appl. No. 16/145,536, entitled "System Operational Analytics Using Normalized Likelihood Scores", filed Sep. 28, 2018.

* cited by examiner

IDENTIFYING ANOMALIES IN USER INTERNET OF THINGS ACTIVITY PROFILE USING ANALYTIC ENGINE

FIELD

The field relates generally to the processing of data from Internet of Things (IoT) devices.

BACKGROUND

An IoT network typically comprises distributed physical devices, such as vehicles and computing devices, that exchange data over the IoT network. With the proliferation of IoT networks and devices, it is expected that a number of IoT devices, such as smart devices, will become user agents and consumers of resources, such as goods, energy and computational power, on behalf of human users. The number of such transactions will likely become so large that it will not be practical for users to individually authorize each transaction. Users will thus be required to authorize their devices to engage in such transactions on their behalf.

A need exists for techniques for detecting anomalies with respect to actions performed by IoT devices on behalf of users.

SUMMARY

In one embodiment, an exemplary method comprises obtaining data from a plurality of Internet of Things (IoT) devices of a user, wherein at least one of the IoT devices comprises an agent device that performs at least one action on behalf of the user; applying the obtained data to a feature engineering module to convert the obtained data into a plurality of time-series features that capture one or more of behavior of an IoT environment of the user and characteristics of the IoT environment of the user, and applying the plurality of time-series features to an analytic engine comprising a multi-variate anomaly detection method that learns one or more patterns in an IoT activity profile of the user for a normal state and identifies an anomaly with respect to an action performed by the agent device based on a health score indicating a deviation from the learned one or more patterns.

In some embodiments, the multi-variate anomaly detection method comprises a Gaussian Mixture Model that calculates a multi-dimensional probability distribution function describing the IoT activity profile of the user, wherein each dimension captures a pattern in a corresponding monitored feature. The Gaussian Mixture Model optionally calculates, for the plurality of time-series features corresponding to a new data point, a weighted distance from a plurality of centers of the multi-dimensional probability distribution. An anomaly alert is optionally generated when the weighted distance exceeds a predefined threshold.

Other illustrative embodiments include, without limitation, apparatus, systems, methods and computer program products comprising processor-readable storage media.

DETAILED DESCRIPTION

Figure 1:
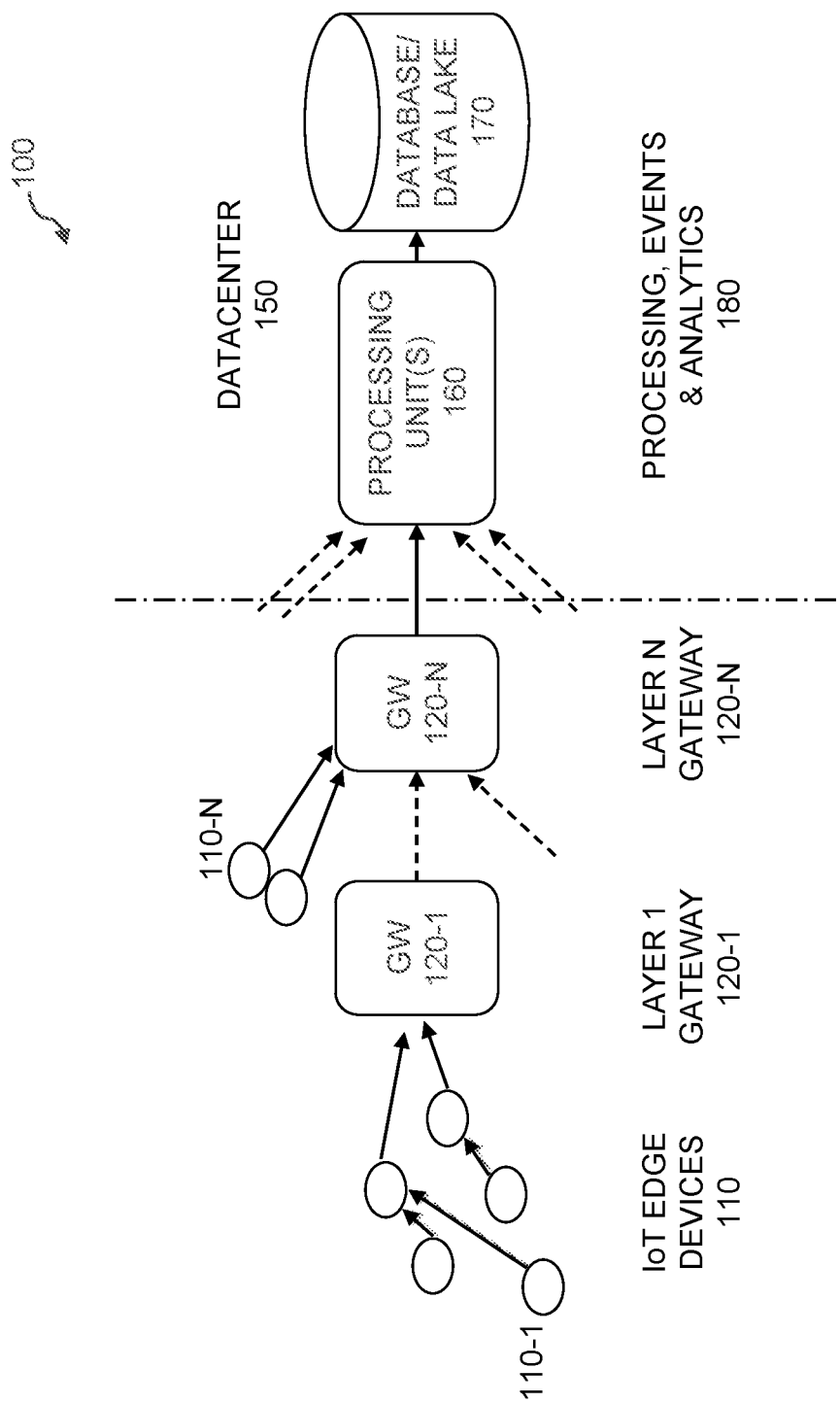
FIG. 1 illustrates an exemplary IoT system, according to one embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. Accordingly, the term "IoT device" as used herein is intended to be broadly construed, so as to encompass, for example, devices designed specifically for a specific purpose, such as refrigerators and automobiles, as well as general-purpose devices, such as smartphones and tablets that perform computations and more general functions. One or more embodiments of the disclosure provide methods, apparatus and computer program products for identifying anomalies in user IoT activity profiles using an analytic engine.

In at least one embodiment, the disclosed IoT data processing techniques detect anomalous IoT activity data, relative to a learned user IoT activity profile, and generate a corresponding health score and/or alerts.

As noted above, IoT devices are increasingly expected to serve as agents of human users and, in some cases, will become individual consumers of resources, such as goods and services. Consider, for example, a refrigerator that orders more groceries, when needed, a smartphone that needs to run a computation on the cloud or an electric car that draws power directly from solar panels in the street. The agent IoT devices often need to be associated with a financial identifier, such as a bank account, credit card or a blockchain wallet, in order to engage in one or more financial transactions.

Facilitating efficient and transparent transactions between consumers and producers, while keeping high levels of anonymity and security, is a complex task. One or more embodiments of the disclosure empower a human user to automatically keep track of trustfulness of one or more agent devices that perform one or more actions on behalf of the user. As discussed hereinafter, an analytic engine is employed in some embodiments to construct an IoT activity profile comprising actions of the user and actions of devices of the user. The learned IoT activity profile is monitored over time to identify an anomaly with respect to an action performed by an agent device, for example, using a health score indicating a deviation from the learned patterns in the IoT activity profile. As the number of daily transactions continues to grow, it will become impractical for a human user to authorize each request. The user will thus have to provide guidelines and rules that specify the scope of authority of an agent device. In this manner, the user is no longer required to directly monitor each transaction performed by an agent device on behalf of the user.

One or more aspects of the disclosure recognize that when a number of automated agents act on their own with financial authorization, malicious agents or even naive bugs can create problems that may go unnoticed for a long period of time. It will be challenging for the human user to understand if the daily/weekly/monthly expenses of many agent devices are reasonable. In addition, hackers could create malicious software that would generate false transactions without exceeding a small percentage of the real transactions, which may go unnoticed.

An important issue to consider when evaluating different monitoring approaches for such agent systems is the fact that in an IoT and blockchain environment, the transaction environment and IoT network typically operate in an anonymous or partly anonymous manner. The number of transactions could easily make it hard to transfer each transaction in real time to a centralized tracking and monitoring tool or person. In addition, many implementations of such IoT networks will be decentralized. When the automated agents in the network are anonymous, and the IoT data is distributed, it is often important to monitor, track and analyze transactions in an environment of the user, where the ownership, agent type and transaction type are known.

In one or more embodiments, a holistic view is maintained of the behavior of a user and the devices of the user. Anomaly detection methods are applied to detect anomalies of individual agent devices, as well as anomalies involving complex patterns with multiple agent devices. Such anomalies can occur, for example, when there is a break in the normal correlation between agent devices that are usually highly coordinated. Such a holistic and dynamic monitoring approach is important for protecting the user from financial harm or fraud and from other types of misuse in a user IoT activity profile.

The classification models currently used by credit companies to identify fraudulent activity are typically based on static snapshots of individual transactions rather than on dynamic signals. The input to such classification models comprises static features of the seller, buyer and the transaction at hand. The decision of fraud/no fraud is made based on labeled past example transactions. To identify fraud involving IoT automatically triggered transactions, the temporal dynamics of the individual IoT profile needs to be considered in addition to static attributes. For example, it is reasonable to assume that a specific user that is bounded to a specific geographical area, will display specific periodical behavior and its usage of IoT services will be restricted to specific levels. Considering only the current values of specific transactions without taking the temporal dynamic into account may lead to missing anomalies and false alerts.

Credit card companies also use anomaly detection methods on a customer financial activity baseline to identify fraud and/or default behavior. These models are designed to identify anomalies in user-initiated transactions. Some of the assumptions that these models are based on do not hold for transactions performed by IoT devices on behalf of human users. A behavior of a customer may, at times, be erratic, in the sense that some irregular transactions may be acceptable. In the context of IoT devices, however, outlier detection algorithms must be more sensitive to gradual changes at a smaller scale. For example, there might be a configuration mishap with a service consumption, such as electricity and/or computational resources, that leads to extensive usage compared to past periods (which may require generation of an alert and a proper investigation).

In the context of credit fraud detection, the correlation between different time-series is typically not considered and the classification of fraudulent activity, as opposed to benign activity, is made based on allegedly independent attributes, such as the size of the transaction and the identities of the seller and buyer. In an IoT activity anomaly detection context, however, the concurrency among different activities is critical. Such non-concurrent behavior of several devices may indicate a device that was stolen (for example in the case of a geographical decoupling of a cellular phone and vehicle). Another example is when the cellular phone is activated in a distant vacation site, while the smart refrigerator keeps stocking itself or the smart house keeps the air conditioning on. A multi-dimensional probability distribution function needs to be calculated over multiple aspects of the user IoT profile simultaneously, in some embodiments, such that it can alert on non-trivial anomalies once the user drifts from the center of mass of the distribution.

In a decentralized anonymous network, such as a blockchain, there is no practical way to monitor the holistic behavior of a specific user by an external vendor since there is no way to link all transactions belonging to a single user. Decentralized systems are very attractive in terms of the privacy and the security that they provide for the customers. On the other hand, customers may not have an incentive to share their data for their own benefit. Anomaly detection tools are typically hard to develop, given decentralized architectures. Hence, there remains a need for a solution that provides alerts to customers for important or suspicious events, while preserving the freedom of choice for the customer, as to how to handle the proprietary data of the customer. In further variations, upon detection of a suspicious or anomalous action by an agent device, one or more remedial actions can be performed on the agent device, such as isolating the agent device, removing the agent device, applying a quarantine on the agent device, limiting the permissions associated with the agent device, analyzing the agent device in a sandbox environment and deactivating the agent device.

FIG. 1 illustrates an exemplary IoT system 100, according to one embodiment of the disclosure. Generally, IoT systems, such as the exemplary IoT system 100, typically consolidate edge devices to gateways and then to a central backend datacenter where most of the processing is done. There can be several layers of gateways. New edge devices are introduced and others retire constantly and the exemplary IoT system 100 needs to handle these topology changes.

As shown in FIG. 1, a plurality of IoT edge devices 110-1 through 110-N (generally referred to herein as IoT devices 110) provide corresponding IoT data to one or more layer 1 through layer N gateways 120-1 through 120-N. The IoT edge devices 110-1 through 110-N comprise, for example, household appliances, sensors, actuators and other devices that produce information or get commands to control the environment they are in. The gateways 120 comprise devices that consolidate communication and management of multiple IoT edge devices 110. For example, an IoT device array can be treated as a first gateway layer 110-1 to the multiple IoT devices that exist within the IoT device array. In some embodiments, vehicles are connected to a regional edge layer (not explicitly shown in FIG. 1), where the region can be, for example, a cell of a cellular network. The regional gateways can be connected in some embodiments to country clouds/gateways that are connected to a global cloud.

One or more aspects of the present disclosure recognize that the IoT data generated by multiple IoT devices, can be used to identify anomalous IoT activity data performed by one or more IoT devices 110 serving as agent devices on behalf of a user, such as anomalous financial transactions performed by the agent device 110 on behalf of the user.

While gateways 120 are employed in the exemplary embodiment of FIG. 1, the gateways 120 are not mandatory. Gateways 120 are prevalent in numerous implementations, as networking capabilities of IoT edge devices 110 are usually local in nature (e.g., power or connectivity) and the gateway 120 is used to connect to the Internet (not shown in FIG. 1).

The IoT devices 110 can be, for example, IoT devices designed for a specific purpose, as well as general-purpose IoT devices, such as, for example, smartphones and tablets that perform computing functions, for example, as would be apparent to a person of ordinary skill in the art. In one or more embodiments, the IoT devices 110 comprise the following public properties: unique identifier (ID), geo-location, and clock timestamp (ongoing).

The exemplary IoT system 100 of FIG. 1 further comprises a datacenter 150 comprising one or more processing unit(s) 160 and a database or data lake 170. The datacenter 150 optionally performs one or more of processing, events and analytics functions 180, in a known manner.

Figure 2:
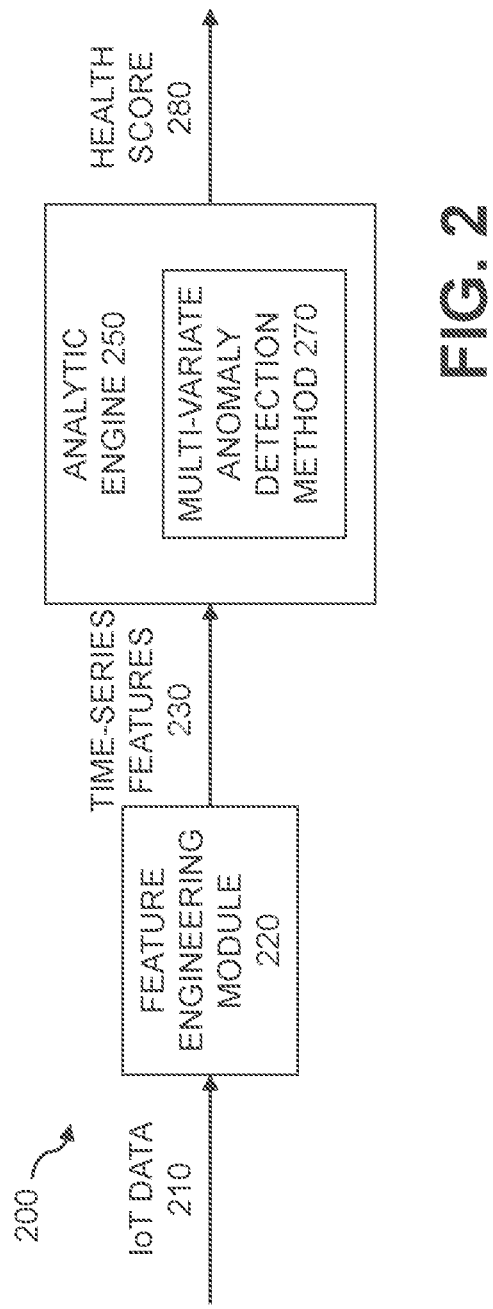
FIG. 2 illustrates an exemplary IoT activity anomaly detection system, according to an embodiment of the disclosure.

FIG. 2 illustrates an exemplary IoT activity anomaly detection system 200, according to an embodiment of the disclosure. An exemplary implementation of the IoT activity anomaly detection system 200 is discussed further below in conjunction with FIG. 4. As shown in FIG. 2, the exemplary IoT activity anomaly detection system 200 comprises a feature engineering module 220 and an analytic engine 250. IoT data 210 from the IoT devices 110 of FIG. 1 is applied to the feature engineering module 220. Generally, the feature engineering module 220 converts the obtained IoT data 210 into time-series features 230 that capture the behavior and/or characteristics of an IoT environment of the user.

The exemplary analytic engine 250 comprises a multi-variate anomaly detection method 270, such as a Gaussian Mixture Model (GMM), as discussed further below. The time-series features 230 are applied to the multi-variate anomaly detection method 270 of the analytic engine 250, for example, in real-time, as the IoT data 210 is received, and as the corresponding time-series features 230 are generated. Generally, the multi-variate anomaly detection method 270 learns patterns in an IoT activity profile of the user for a normal state and identifies an anomaly with respect to an action performed by at least one agent device based on a health score 280 indicating a deviation from the learned patterns.

Figure 3:
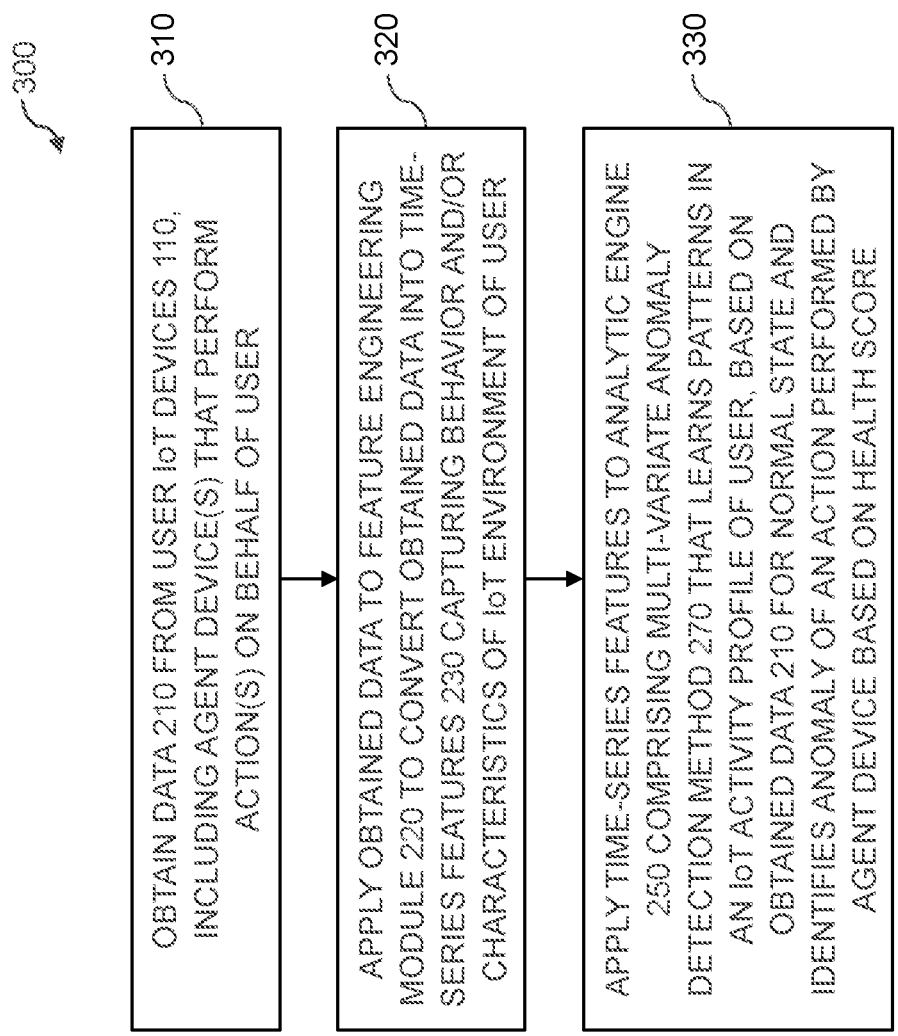
FIG. 3 is a flow chart illustrating a IoT activity anomaly detection process performed by the exemplary IoT activity anomaly detection system of FIG. 2, according to some embodiments.

FIG. 3 is a flow chart illustrating an IoT activity anomaly detection process 300 performed by the exemplary IoT activity anomaly detection system 200 of FIG. 2, according to some embodiments. As shown in FIG. 3, the exemplary IoT activity anomaly detection process 300 initially obtains IoT data 210 from user IoT devices 110 during step 310, including agent device(s) that perform action(s) on behalf of user. During step 320, the obtained IoT data 210 is applied to the feature engineering module 220 to convert the obtained IoT data 210 into time-series features 230 capturing behavior and/or characteristics of the IoT environment of the user.

Finally, during step 330, the exemplary IoT activity anomaly detection process 300 applies the time-series features 230 to the analytic engine 250 comprising the multi-variate anomaly detection method 270 that learns patterns in an IoT activity profile of the user, based on the obtained IoT data 210, for a normal state and identifies an anomalous action performed by an agent device 110 based on a health score 280. An anomalous action comprises, for example, affirmative actions, virtual actions, electronic actions, financial transactions, passive actions (e.g., a renewal or updating of an existing subscription) and implicit actions (e.g., a failure to decline or cancel leads to an automatic renewal).

Figure 4:
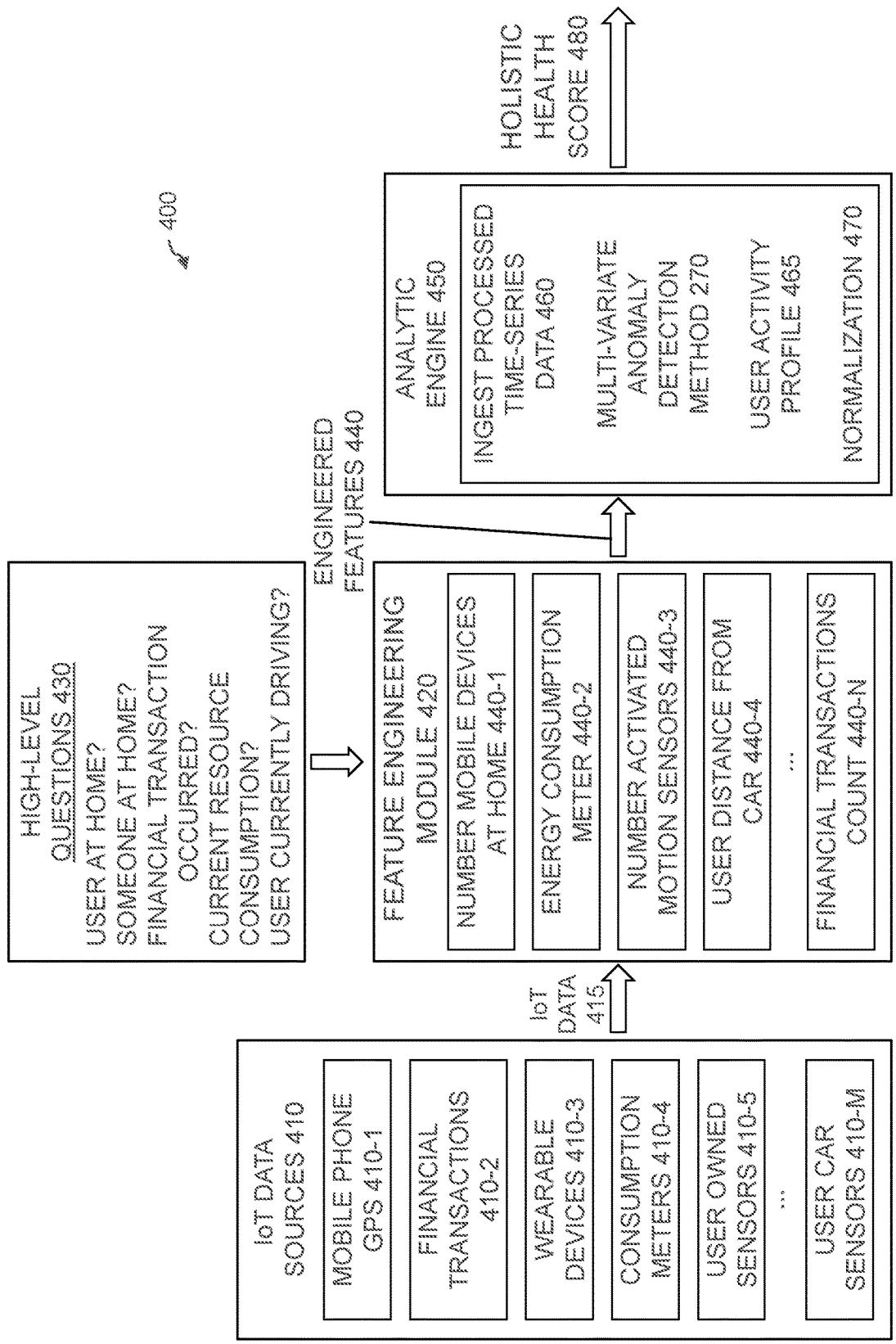
FIG. 4 illustrates an exemplary implementation of the exemplary IoT activity anomaly detection system of FIG. 2 in further detail, according to one embodiment of the disclosure.

FIG. 4 illustrates an exemplary implementation 400 of the exemplary IoT activity anomaly detection system 200 of FIG. 2 in further detail, according to one embodiment of the disclosure. As shown in FIG. 4, the exemplary IoT activity anomaly detection system implementation 400 comprises an analytic engine 450 that processes a number of engineered features 440 generated by a feature engineering module 420, based on IoT data 415 from a plurality of IoT data sources 410, and a number of high-level questions 430.

The exemplary IoT data sources 410 comprise a number of endpoints, data producers and/or device connectors that connect to different sensors and devices to collect the IoT data 415 to be used for detecting the anomalies. In the example of FIG. 4, the exemplary IoT data sources 410 comprise IoT data sources 410-1 through 410-M, such as a mobile phone global positioning system (GPS) 410-1, financial transactions 410-2, wearable devices 410-3, consumption meters 410-4, user owned sensors 410-5, and user car sensors 410-M.

In some embodiments, the device connectors are based on an application programming interface (API) for handling each desired data source type. For example, a connector for a wearable device 410-3 will know how to interface with the particular device and will preferably import desired online or offline information generated at each time point, such as GPS location, heart rate, type of activity, and other performance measures. This component is flexible and should support each data source 410 that can contribute to the solution.

As noted above, the feature engineering module 420 converts the collected IoT data 415 into meaningful engineered features 440. These engineered features 440 are established based on predefined high-level information or questions 430 to be obtained about the user and/or the IoT environment of the user. Generally, the feature engineering module 420 processes the IoT data 415 and one or more high-level questions 430 as raw materials for generating the engineered features 440 that capture behavior and characteristics of the user environment. In general, the high-level questions 430 are initially defined and then low-level engineered features 440 are derived that manifest these characteristics.

For example: the IoT activity anomaly detection system 200 can be designated to capture an anomalous presence at the user home. In this example, the exemplary high-level questions 430 can be defined as "Is the user (or someone) at home?" as a high-level characteristic of the system. This can be specified into several low-level features such as "Is smartphone at home?" that monitors the presence of the cell phone of the user at the home of the user; "Is user wearable device at home?" which monitors the presence of the wearable device 410-3 of the user at the home of the user. Another high-level concept that can be defined is "Is there any activity at home?," which can be measured, for example, by the values of the water or electricity consumption meters 410-4 or by the activation of motion sensors in the home of the user. Combining features that are related to these high-level concepts may enable the analytic module to detect anomalies that stem from home suspicious presence/activity while the user is out, like intruders or excessive energy consumption. It is important to mention that the collected features are time-series related features so each feature value can be crossed with any other feature values at the same point in time to generate new meaningful engineered features, while it can also be related and modeled by previous points in time, in a known manner. In further variations, the high-level questions 430 comprise, for example, whether a financial transaction has occurred; estimating a current resource consumption; and whether the user is currently driving.

Whenever a new type of anomaly detection procedure is required, the high-level questions 430 can be updated and consequently, the low-level engineered features 440 are updated as well. This capability virtually defines a self-monitoring tool that leverages the entire data space of the user for anomaly detection purposes.

In the example of FIG. 4, the feature engineering module 420 generates engineered features 440-1 through 440-N, such as number mobile devices at home 440-1, energy consumption meter 440-2, number activated motion sensors 440-3, user distance from car 440-4, and financial transactions count 440-N.

Finally, the analytic engine 450 integrates the engineered features 440 towards providing a single health score 480 for the system state. In one or more embodiments, the disclosed IoT activity anomaly detection techniques should be deployed in an accessible environment of the user, such as private machines with sufficient storage and computing power or in a public cloud or in some hybrid fashion.

As previously indicated, the analytic engine 450 employs a multi-variate anomaly detection method 270, such as a Gaussian Mixture Model (GMM) that learns the user IoT profile 465 for a normal state and can alert on observations within ingested processed time-series data 460 (e.g., the engineered features 440) that diverge from the learned pattern. More specifically, in one or more embodiments, the exemplary multi-variate anomaly detection method 270 calculates a multi-dimensional probability distribution function describing the IoT activity profile 465 of the user, with each dimension capturing the pattern in some monitored feature. For example, a dimension of the multi-dimensional probability distribution can be the number of cellular devices within the area of the household or the GPS location of the car of the user. The multi-variate anomaly detection method 270 combines multiple monitored low-level engineered features 440 into a single health score 480 (e.g., following a normalization process 470) and can identify non-trivial anomalies concerning the correlation between multiple low-level engineered features 440. Using a mixture of Gaussian models to model the user IoT activity profile 465 allows the distribution to have several modes or center of masses. A GMM model, for example, is appropriate for representing a behavior that has several operating modes (e.g., routine activity and vacation activity; as well as working hours and sleeping hours). For a new data point of current low level engineered features 440, the weighted distance from the different centers of the distribution is calculated and there is an alert on an anomaly in case the weighted distance exceeds a predefined threshold.

Figure 5:
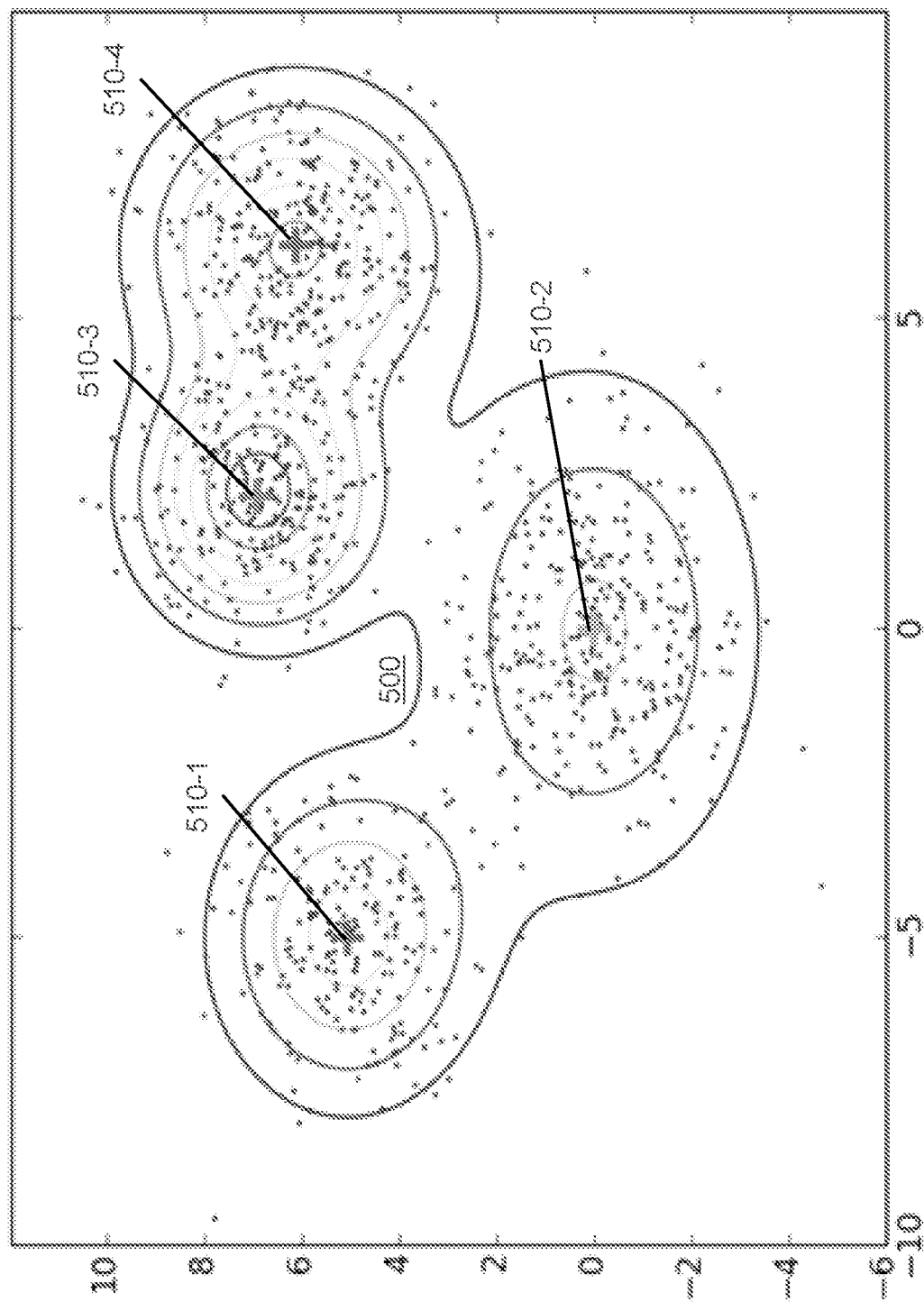
FIG. 5 illustrates an exemplary Gaussian Mixture Model for modeling a user IoT activity profile, according to at least one embodiment.

FIG. 5 illustrates an exemplary Gaussian Mixture Model 500 for modeling a user IoT activity profile 465, according to at least one embodiment. Generally, the exemplary GMM 500 shown in FIG. 5 is a projection on two axes of multiple feature combinations (e.g., multiple dimensions reduced to two dimensions). As shown in FIG. 5, the exemplary GMM 500 comprises a plurality of center of masses 510-1 through 510-4 corresponding to different operating modes of activity of the respective user (e.g., routine activity and vacation activity; as well as working hours and sleeping hours). The underlying probability distribution of the GMM spans multiple dimensions (e.g., monitored low-level engineered features 440) with several modes of user activity. Data points outside of a respective data cluster associated with a center of mass 510 may be considered an anomaly.

The disclosed approach for identifying anomalies in the user IoT profile 465 is based on generating a probability density function with multiple low level engineered features 440 as the dimensions of the distribution. In some embodiments, the samples for the training of the distribution are vectors whose entries are the current values for each of the monitored low level engineered features 440 (thus, the model can learn the holistic IoT profile 465 and its dynamics with time). Once a new data point arrives, the new data point is identified as an anomaly based on its calculated distance from the center of the multi-dimensional distribution. This approach automatically weighs and considers the cumulative activity of all the monitored low-level engineered features 440 for making the decision of whether to alert on an anomaly.

One or more embodiments consider correlations between different low-level engineered features 440 to accurately identify anomalies in the IoT activity profile 465 of a user. Some of the collected low level engineered features 440 may be meaningless for identifying abnormal behavior when considered by themselves, but when paired with additional low level engineered features 440 become informative of the current "system" state. For example, information regarding the number of devices the user operated for a specific time stamp is only valuable when it is combined with information regarding the amount of transactions the user allegedly performed for the same time stamp (e.g., to identify a potential online credit-fraud).

The disclosed techniques for identifying anomalies in user IoT activity profiles using an analytic engine allows users to "share" their data with the exemplary IoT activity anomaly detection system 200 that is stored in multiple decentralized sources for modeling purposes. In return, the user gains the benefit of alerting and preventing unwelcome and/or unauthorized actions.

In some embodiments, the disclosed techniques for identifying anomalies in user IoT activity profiles using an analytic engine provide a mechanism for automatic detection of anomalies by IoT agent devices of a user that performs one or more actions on behalf of the user.

Among other benefits, in some embodiments, the disclosed techniques for identifying anomalies in user IoT activity profiles using an analytic engine process multiple engineered features 440 and can detect activity anomalies without requiring human monitoring. As noted above, the exemplary IoT activity anomaly detection system 200 of FIG. 2 identifies an anomaly with respect to an action performed by the agent device based on a health score indicating a deviation from the learned one or more patterns.

One or more embodiments of the disclosure provide improved methods, apparatus and computer program products for identifying anomalies in user IoT activity profiles using an analytic engine. The foregoing applications and associated embodiments should be considered as illustrative only, and numerous other embodiments can be configured using the techniques disclosed herein, in a wide variety of different applications.

It should also be understood that the disclosed anomaly detection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for identifying anomalies in user IoT activity profiles using an analytic engine may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based IoT activity anomaly detection engine 200, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based IoT activity anomaly detection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
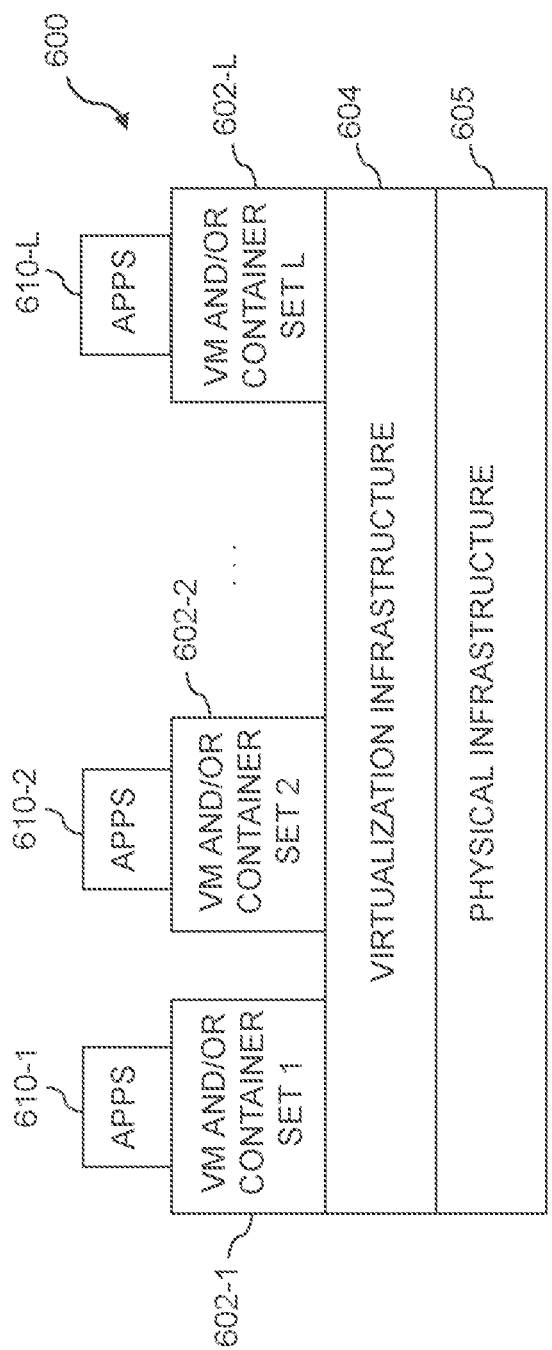
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the IoT activity anomaly detection system 200. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide anomaly detection functionality of the type described above for one or more processes running on a given one of the VMs. For example, each of the VMs can implement anomaly detection control logic and associated anomaly detection activity profiles 465 for identifying anomalous activities by agent devices on behalf of a user for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide anomaly detection functionality of the type described above for one or more processes running on different ones of the containers. For example, a container host device supporting multiple containers of one or more container sets can implement one or more instances of anomaly detection control logic and associated anomaly detection activity profiles 465 for use in identifying anomalous activities by agent devices on behalf of a user.

As is apparent from the above, one or more of the processing modules or other components of IoT activity anomaly detection system 200 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
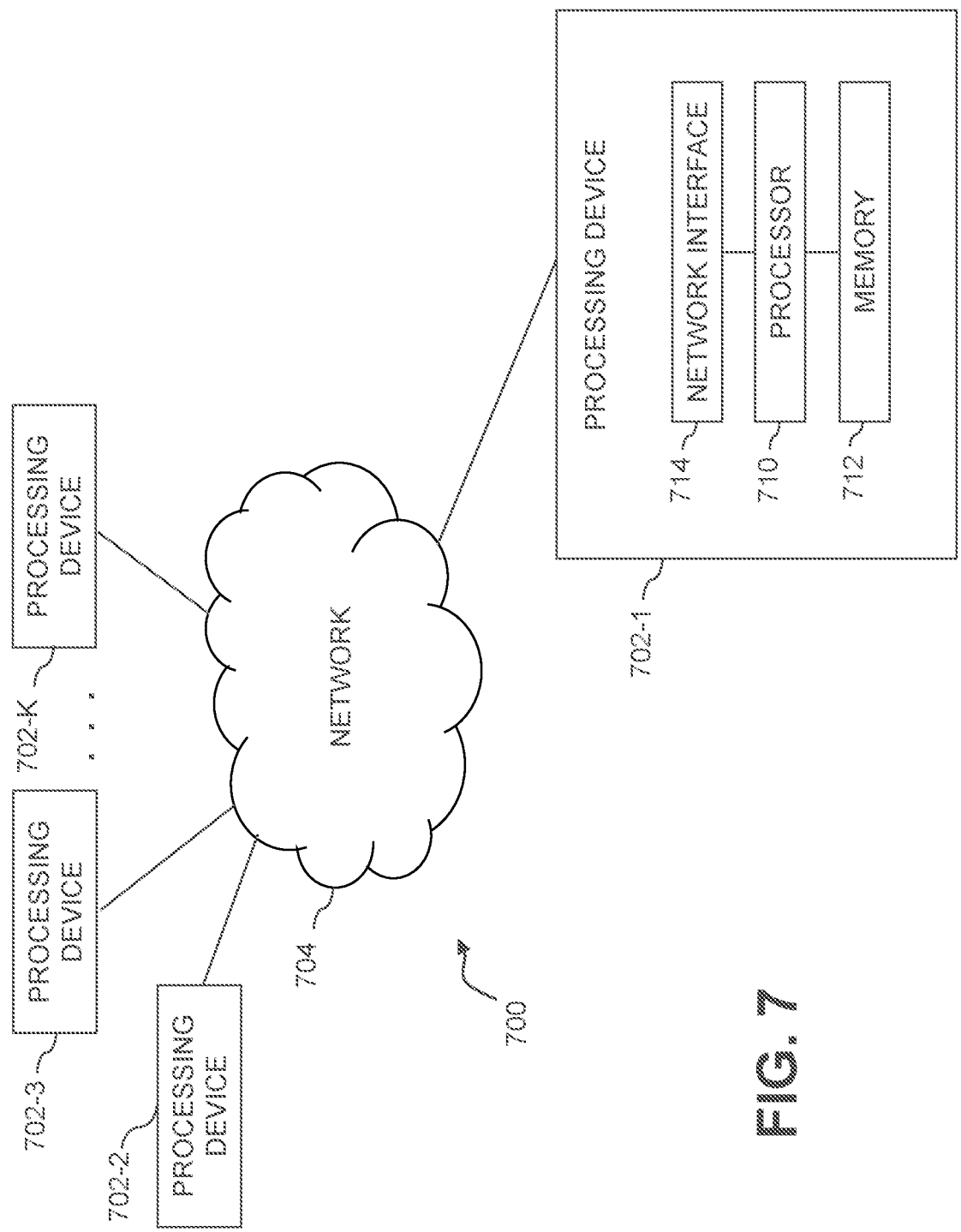
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining data from a plurality of Internet of Things (IoT) devices of a human user, wherein at least one of the IoT devices comprises an agent device that performs at least one action as an agent on behalf of the human user;
   applying, using at least one processing device, the obtained data to a feature engineering module to convert the obtained data into a plurality of time-series features that capture one or more of behavior of an IoT environment of the human user and characteristics of the IoT environment of the human user; and
   applying, using the at least one processing device, the plurality of time-series features to an analytic engine comprising a multi-variate anomaly detection method that (i) learns one or more patterns in an IoT activity profile of the human user for a normal state and (ii) calculates a multi-dimensional probability distribution that evaluates a temporal correlation between feature values of at least two of the plurality of time-series features, to identify an anomaly with respect to a given action of the at least one action performed by the agent device as the agent of the human user, wherein the anomaly is identified based at least in part on an evaluation of a health score that combines the plurality of time-series features to identify a deviation from the learned one or more patterns.

2. The method of claim 1, wherein the obtaining data from the plurality of IoT devices of the human user employs a plurality of device connectors for connecting to IoT devices of corresponding device types.

3. The method of claim 1, wherein the time-series features are defined based on predefined high-level information to be determined regarding one or more of the human user and the IoT environment of the human user.

4. The method of claim 1, wherein the applying the plurality of time-series features to the analytic engine is performed following the obtaining of the corresponding data.

5. The method of claim 1, further comprising generating one or more new engineered features by crossing at least two of the time-series features at a same point in time.

6. The method of claim 1, wherein the multi-variate anomaly detection method comprises a Gaussian Mixture Model that calculates the multi-dimensional probability distribution function describing the IoT activity profile of the human user, wherein each dimension captures a pattern in a corresponding monitored feature.

7. The method of claim 6, wherein the Gaussian Mixture Model calculates, for the plurality of time-series features corresponding to a new data point, a weighted distance from a plurality of centers of the multi-dimensional probability distribution, wherein an anomaly alert is generated when the weighted distance exceeds a predefined threshold.

8. The method of claim 1, wherein the applying the plurality of time-series features to the analytic engine is performed by one or more applications running in a domain of the human user.

9. The method of claim 1, wherein the data comes from one or more service providers that one or more of the human user interacts with and at least one device of the human user interacts with.

10. The method of claim 1, wherein the action performed by the agent device comprises a financial transaction performed by the agent device.

11. A system, comprising:
a memory; and
at least one processing device, coupled to the memory, operative to implement the following steps:
obtaining data from a plurality of Internet of Things (IoT) devices of a human user, wherein at least one of the IoT devices comprises an agent device that performs at least one action as an agent on behalf of the human user;
applying the obtained data to a feature engineering module to convert the obtained data into a plurality of time-series features that capture one or more of behavior of an IoT environment of the human user and characteristics of the IoT environment of the human user; and
applying the plurality of time-series features to an analytic engine comprising a multi-variate anomaly detection method that (i) learns one or more patterns in an IoT activity profile of the human user for a normal state and (ii) calculates a multi-dimensional probability distribution that evaluates a temporal correlation between feature values of at least two of the plurality of time-series features, to identify an anomaly with respect to a given action of the at least one action performed by the agent device as the agent of the human user, wherein the anomaly is identified based at least in part on an evaluation of a health score that combines the plurality of time-series features to identify a deviation from the learned one or more patterns.

12. The system of claim 11, further comprising generating one or more new engineered features by crossing at least two of the time-series features at a same point in time.

13. The system of claim 11, wherein the multi-variate anomaly detection method comprises a Gaussian Mixture Model that calculates the multi-dimensional probability distribution function describing the IoT activity profile of the human user, wherein each dimension captures a pattern in a corresponding monitored feature.

14. The system of claim 13, wherein the Gaussian Mixture Model calculates, for the plurality of time-series features corresponding to a new data point, a weighted distance from a plurality of centers of the multi-dimensional probability distribution, wherein an anomaly alert is generated when the weighted distance exceeds a predefined threshold.

15. The system of claim 11, wherein the action performed by the agent device comprises a financial transaction performed by the agent device.

16. A computer program product, comprising a non-transitory machine-readable storage medium having encoded therein executable code of one or more software programs, wherein the one or more software programs when executed by at least one processing device perform the following steps:
obtaining data from a plurality of Internet of Things (IoT) devices of a human user, wherein at least one of the IoT devices comprises an agent device that performs at least one action as an agent on behalf of the human user;
applying the obtained data to a feature engineering module to convert the obtained data into a plurality of time-series features that capture one or more of behavior of an IoT environment of the human user and characteristics of the IoT environment of the human user; and
applying the plurality of time-series features to an analytic engine comprising a multi-variate anomaly detection method that (i) learns one or more patterns in an IoT activity profile of the human user for a normal state and (ii) calculates a multi-dimensional probability distribution that evaluates a temporal correlation between feature values of at least two of the plurality of time-series features, to identify an anomaly with respect to a given action of the at least one action performed by the agent device as the agent of the human user, wherein the anomaly is identified based at least in part on an evaluation of a health score that combines the plurality of time-series features to identify a deviation from the learned one or more patterns.

17. The computer program product of claim 16, further comprising generating one or more new engineered features by crossing at least two of the time-series features at a same point in time.

18. The computer program product of claim 16, wherein the multi-variate anomaly detection method comprises a Gaussian Mixture Model that calculates the multi-dimensional probability distribution function describing the IoT activity profile of the human user, wherein each dimension captures a pattern in a corresponding monitored feature.

19. The computer program product of claim 18, wherein the Gaussian Mixture Model calculates, for the plurality of time-series features corresponding to a new data point, a weighted distance from a plurality of centers of the multi-dimensional probability distribution, wherein an anomaly alert is generated when the weighted distance exceeds a predefined threshold.

20. The computer program product of claim 16, wherein the action performed by the agent device comprises a financial transaction performed by the agent device.

\* \* \* \* \*